(12) United States Patent
Summers (10) Patent No.: US 11,435,180 B2
(45) Date of Patent: Sep. 6, 2022

(54) METHOD AND APPARATUS FOR MEASUREMENT CYCLE GENERATION

(71) Applicant: RENISHAW PLC, Wotton-under-Edge (GB)

(72) Inventor: Martin Peter Summers, Hong Kong (CN)

(73) Assignee: RENISHAW PLC, Wotton-Under-Edge (GB)

( * ) Notice: Subject to any disclaimer, the term of this patent is extended or adjusted under 35 U.S.C. 154(b) by 80 days.

(21) Appl. No.: 17/261,906

(22) PCT Filed: Aug. 12, 2019

(86) PCT No.: PCT/GB2019/052260
§ 371 (c)(1),
(2) Date: Jan. 21, 2021

(87) PCT Pub. No.: WO2020/035667
PCT Pub. Date: Feb. 20, 2020

(65) Prior Publication Data
US 2021/0285762 A1  Sep. 16, 2021

(30) Foreign Application Priority Data
Aug. 14, 2018 (EP) ..................... 18189050

(51) Int. Cl.
*G01B 5/008* (2006.01)
*G01B 21/04* (2006.01)
(52) U.S. Cl.
CPC .................. *G01B 21/047* (2013.01)
(58) Field of Classification Search
CPC .................................................. G01B 5/0008
(Continued)

(56) References Cited

U.S. PATENT DOCUMENTS

| 4,153,998 A |   | 5/1979 | McMurtry |
|---|---|---|---|
| 5,083,379 A | * | 1/1992 | Enderle .............. G05B 19/4144 33/561 |

(Continued)

FOREIGN PATENT DOCUMENTS

WO  2018/134585 A1  7/2018

OTHER PUBLICATIONS

Sep. 12, 2019 Search Report issued in International Patent Application No. PCT/GB2019/052260.

(Continued)

*Primary Examiner* — George B Bennett
(74) *Attorney, Agent, or Firm* — Oliff PLC (57) ABSTRACT

A method for generating a measurement cycle for inspecting an object using a measurement probe carried by a coordinate positioning apparatus, computer program and apparatus, wherein the measurement cycle includes a measurement path where the measurement probe moves relative to the object enabling inspection of the object using a series of touch trigger measurements. The method includes defining multiple touch trigger measurement points on the surface of the object. Each of the touch trigger measurement points has an associated stand-off position from which the measurement probe accelerates towards the touch trigger measurement point wherein the touch trigger measurement points separate from the associated stand-off position by a stand-off distance The method further includes defining different stand-off distances for at least some of the touch trigger measurement points and calculating a probing feed-rate for use when acquiring each touch trigger measurement point based on the stand-off distance associated therewith.

15 Claims, 4 Drawing Sheets

(58) Field of Classification Search
USPC .......................................................... 33/503
See application file for complete search history.

(56) References Cited

U.S. PATENT DOCUMENTS

| | | | | |
|---|---|---|---|---|
| 7,866,056 B2* | 1/2011 | Ould | .................... | G01B 21/042 |
| | | | | 33/503 |
| 7,908,759 B2* | 3/2011 | McLean | ............. | G05B 19/4207 |
| | | | | 33/503 |
| 9,009,985 B2* | 4/2015 | Stevens | ................ | G01B 21/047 |
| | | | | 33/503 |
| 9,400,178 B2 | 7/2016 | Marshall et al. | | |
| 9,726,481 B2* | 8/2017 | McMurtry | ............. | G01B 5/008 |
| 9,726,482 B2* | 8/2017 | Iseli | ........................ | G01B 3/008 |
| 11,243,062 B2* | 2/2022 | Kanbe | .................. | G01B 21/045 |
| 2005/0171733 A1 | 8/2005 | Hough | | |

OTHER PUBLICATIONS

Sep. 12, 2019 Written Opinion of the International Searching Authority issued in International Patent Application No. PCT/GB2019/052260.

Nov. 29, 2018 Search Report issued in European Patent Application No. 18189050.0.

* cited by examiner

METHOD AND APPARATUS FOR MEASUREMENT CYCLE GENERATION

The present invention relates to a method for generating measurement cycles for collecting touch trigger measurements using a measurement probe carried by a coordinate positioning apparatus, such as a machine tool or the like.

Numerically controlled machine tools are widely used in industrial manufacturing applications. It is also known that a variety of measurement probes can be installed on such machine tools in order to inspect objects (workpieces) before and/or after a machining process. A touch trigger measurement probe of the type described in U.S. Pat. No. 4,153,998 is one example of measurement probe that can be used on a machine tool. Such a measurement probe comprises a kinematic mechanism in which a stylus holder becomes unseated from an associated seat in the probe body when the stylus contacts an object. Unseating of the kinematic mechanism also breaks an electrical circuit thereby generating a trigger signal. Touch trigger probes are also known in which stylus deflection is measured using strain gauges or the like and a trigger signal is issued when a certain stylus deflection threshold is exceeded. The trigger signal issued by a touch trigger probe thus indicates that contact has been made with an object. This trigger signal is fed into a SKIP input of the machine tool's numerical controller (NC) and is used in combination with measurements of the probe position taken by the NC to determine the position of the contacted point on the surface of the object.

A large variety of strategies or cycles have been developed over the years for measuring objects using a series of touch trigger measurements. For higher specification machine tools having a so-called direct or "high speed" SKIP input, so-called one-touch measurements can be used. Such measurements involve driving the stylus of the measurement probe into the object being measured at a relatively high feed-rate and the position of a point on the surface of the object is found from the position of the measurement probe, as measured by the machine tool, at the instant the trigger signal is issued. The measurement of multiple points on the surface of an object in accordance with such predetermined measurement cycles allow various object properties, such as shape, form, size, position and orientation etc to be determined.

Presently, multiple measurement parameters are set in advance of generating a measurement cycle for inspecting an object. This will typically include setting a probing feed-rate (i.e. the speed at which the probe is moved towards the object when acquiring a touch trigger measurement) during the commissioning and/or calibration procedure for use with any touch trigger measurement cycles that are to be performed on the apparatus. The machine tool user will, when programming the machine tool to implement a measurement cycle, define a certain stand-off distance (i.e. an initial separation of the probe from the object) for each touch trigger measurement. The present inventors have found that various disadvantages are associated with this prior art technique. For example, measurements errors will arise if the stand-off distance set by the user is too short. Conversely, cycle times will be longer than necessary if the stand-off distance set by the user is too long, thereby reducing machine tool productivity.

U.S. Pat. No. 9,400,178 describes a method for calculating an optimum stand-off distance for surface position measurements acquired by a coordinate positioning apparatus.

This calculation is performed using a measured acceleration characteristic of the coordinate positioning apparatus and all subsequent touch trigger measurements are acquired using the optimum stand-off distance and its associated probing feed-rate. Pre-setting both the stand-off distance and probing feed-rate in this manner ensures the measurement probe is not accelerating relative to the object at the instant each touch trigger measurement point is acquired. This prevents acceleration effects from introducing positional uncertainty into the acquired surface position measurements.

Although the technique of U.S. Pat. No. 9,400,178 calculates an optimum stand-off distance for the probing feed-rate, the present inventors have also found disadvantages in using a single, pre-set, stand-off distance and probing feed-rate for each touch trigger measurement point acquired during a measurement cycle. In particular, the size and/or location of certain features of an object (e.g. small bores or pockets) may prevent the measurement probe from being separated from the surface by the (optimum) stand-off distance required to ensure a sufficiently accurate measurement. This can lead to touch trigger measurements being taken of non-optimum points on the surface of an object or the use of a lower probing feed-rate for all measurement points (i.e. to reduce the associated stand-off distance) which negatively impacts cycle time.

According to a first aspect of the present invention, a method is provided for generating a measurement cycle for inspecting an object using a measurement probe carried by a coordinate positioning apparatus, the measurement cycle including a measurement path along which the measurement probe is moved relative to the object to enable inspection of the object using a series of touch trigger measurements, the method comprising the step of;

defining a plurality of touch trigger measurement points on the surface of the object, each of the plurality of touch trigger measurement points having an associated stand-off position from which the measurement probe is accelerated towards the touch trigger measurement point, each of the plurality of touch trigger measurement points being separated from the associated stand-off position by a stand-off distance, characterised in that the method comprises defining different stand-off distances for at least some of the plurality of touch trigger measurement points and calculating a probing feed-rate to be used when acquiring each touch trigger measurement point based on the stand-off distance associated therewith.

The method of the present invention thus relates to generating a measurement cycle that can be used to inspect an object, such as a workpiece. The inspection is performed using a measurement probe, such as a touch trigger measurement probe having a deflectable stylus, that is carried by a coordinate positioning apparatus. The measurement cycle includes a set of instructions, such as a set of G-code commands, that define how the measurement probe is moved relative to the object.

As is usual in the art, the relative motion between the measurement probe and the object may be provided by movement of the measurement probe, movement of the object or movement of both the measurement probe and the object. In one embodiment described below, the measurement probe is carried by a moveable portion (e.g. the quill or spindle) of the coordinate positioning apparatus and moved into contact with a stationary object.

The measurement cycle generated using the present method includes a measurement path along which the measurement probe is moved relative to the object to enable inspection of the object using a series of touch trigger measurements. This measurement cycle may be implemented using a single measurement sub-program or by calling a series of sub-programs that together provide a measurement cycle for measuring the object. Each touch trigger measurement involves bringing the measurement probe into a surface sensing relationship with the object (e.g. so a stylus of a contact measurement probe is deflected by a detectable amount) to acquire a touch trigger measurement point. The touch trigger measurements are thus collected, one at a time, by repeatedly moving the measurement probe into, and out of, a surface sensing relationship with the object. Such touch trigger measurement can thus be seen to be different to scanning measurements in which many points are acquired as the measurement probe is moved or traced around a contour of the surface (i.e. with the stylus of a contact measurement probe remaining in constant contact with the surface to thereby scan along a path on the object's surface).

The method of the present invention also comprises defining a plurality of touch trigger measurement points on the surface of the object. These touch trigger measurement points may be defined to measure, for example, key aspects (e.g. dimensions, orientation etc) of the object being inspected. As well as defining each measurement point on the object, each of the plurality of touch trigger measurement points also has an associated stand-off position from which the measurement probe is accelerated towards that touch trigger measurement point. In other words, a stand-off position is defined for each touch trigger measurement point from which movement towards the measurement point is initiated. Each of the plurality of touch trigger measurement points is thus separated from its associated stand-off position by a so-called stand-off distance.

In accordance with the present invention, a different stand-off distance is used for at least some of the plurality of touch trigger measurement points that form the measurement cycle. In other words, instead of using a fixed stand-off distance for each measurement point in the cycle an optimum stand-off distance for each individual measurement point is set. This optimum stand-off distance may be calculated using many factors. For example, it may take into account access issues associated with the surface being measured, the required tolerance of each measurement, the direction of probe incidence on the surface etc. A stand-off distance for each touch trigger measurement point may be automatically generated during generation of the measurement cycle (e.g. software generating a measurement cycle may use certain criteria to define each stand-off distance). In a preferred embodiment, the user themselves may manually set the stand-off distances (e.g. by reference to a CAD model of the object) when generating the measurement cycle. After establishing a stand-off position and hence a stand-off distance for each touch trigger measurement point, a corresponding (optimum) probing feed-rate is calculated for each touch trigger measurement point. The probing feed-rate is the commanded speed at which the touch trigger measurement is collected. In this manner, the feed-rate used for acquiring each touch trigger measurement point can be different (i.e. if the defined stand-off distances are different).

Instead of setting a single probing feed-rate for all touch trigger measurements of a particular measurement cycle, the method of the present invention takes the desired (e.g. pre-calculated or user-defined) stand-off distance and then determines a probing feed-rate that is optimum for each touch trigger measurement point. This has the advantage that, unlike prior methods, touch trigger measurements of the desired accuracy can be acquired for all measurement points without impacting on the overall cycle time. For example, fast measurements may be acquired for points on the outer surface of an object whilst slower measurement taken of points that require a shorter stand-off distance because they are more difficult to access. The requirement associated with the technique of U.S. Pat. No. 9,400,178 to slow down all measurements (i.e. globally reduce the probing feed-rate) to ensure a subset of measurements points can be acquired with sufficiently high accuracy is thus avoided.

As will be explained in more detail below, the acceleration characteristics vary for different types of coordinate positioning apparatus. For certain coordinate positioning apparatus, the time taken to accelerate or decelerate from a standstill to a given speed is constant. For other apparatus, acceleration occurs at a constant rate. The speed or probing feed-rate to be used for a surface position measurement is thus set taking into account the acceleration characteristics of the coordinate positioning apparatus and the defined stand-off distance for the particular measurement point. Advantageously, the probing feed-rate calculated for each touch trigger measurement point ensures that acceleration to the probing feed-rate has occurred prior to measurement of the touch trigger measurement point. In other words, a probing speed is selected for each measurement point that is sufficiently low to ensure it can be attained before the measurement point is taken. This ensures the measurement point isn't acquired during a period when there is any substantial acceleration of the measurement probe relative to the object (i.e. it ensures the measurement is taken outside the acceleration zone mentioned below).

Preferably, the probing feed-rate for each touch trigger measurement point is selected to be the highest feed-rate that ensures acceleration to the probing feedrate has occurred prior to measurement of the touch trigger measurement point. In other words, to minimise cycle time, the fastest possible feed-rate may be selected for each measurement point that ensures each measurement is taken in absence of acceleration. It should be noted that the measurement probe may initiate each probing move from a stationary start at the stand-off position. It is, however, also possible for the probe to be moving at a certain feed-rate (e.g. the feed-rate used to move the measurement probe between different stand-off positions) when it reaches the stand-off position from which it is commanded to attain the probing feed-rate. The feed-rate and/or the direction of probe motion at the stand-off position may thus also be used when calculating the desired probing feed-rate and/or when setting the stand-off position for a certain measurement point.

Conveniently, the probing feed-rate is calculated separately for each touch trigger measurement point. Preferably, the probing feed-rate is calculated using an acceleration characteristic of the machine tool. In other words, an optimum probing feed-rate may be calculated on a point-by-point basis using the stand-off distance (i.e. the separation between the stand-off position and the associated touch trigger measurement point) and optionally the acceleration characteristics of the coordinate positioning apparatus. The probing feed-rate calculation may be performed using a mathematical expression. Alternatively, the probing feed-rate calculation may be performed using a look-up table. It would also be possible for sub-sets of stand-off distances to be defined that are associated with certain optimum probing feed-rates.

An acceleration characteristic of the coordinate positioning apparatus may be measured in a number of ways. U.S. Pat. No. 9,400,178, which is hereby incorporated herein by reference, describes a variety of suitable techniques that may be used. For example, an acceleration characteristic of the coordinate positioning apparatus may be determined by measuring a time interval that corresponds to the time taken for a moveable portion of the coordinate positioning apparatus to move between two points of known separation at a commanded speed. It should also be noted that the term acceleration characteristic as used herein encompasses both acceleration and deceleration effects. A plurality of acceleration characteristics may be measured for a coordinate positioning apparatus. For example, an acceleration zone may be measured separately for each machine axis.

The calibration of touch trigger measurements has typically been performed using a single probing feed-rate. As will be explained in more detail below, there is typically a substantially constant time delay between the coordinate positioning apparatus capturing measurement probe position based on receipt of a trigger signal received from the measurement probe and the point at which the measurement probe first attained a certain positional relationship with the object being measured (e.g. where a stylus first made contact with the object). For faster probing feed-rates, the constant time delay results in a larger (but predictable) difference in position between the positional relationship being attained between the measurement probe and the object and the capture of the measurement probe position.

In view of the above, a compensation is advantageously applied to touch trigger measurement points collected at different probing feed-rate. The compensation preferably takes account of the substantially constant time delay between the measurement probe establishing a position sensing relationship with each touch trigger measurement point and the collection of positional information by the coordinate positioning apparatus. This allows any touch trigger measurement points taken at different feed-rates to be appropriately calibrated to give correct positional measurements.

The method of the present invention may be implemented on any coordinate positioning apparatus, such as a machine tool, robot or dedicated coordinate measuring machine (CMM). Advantageously, the method is conducted on a numerically controlled coordinate positioning apparatus. Preferably, the coordinate positioning apparatus comprises a machine tool. As would be understood by those skilled in the art, a machine tool is capable of machining an object (e.g. cutting, milling, grinding, drilling etc) and is not merely a measurement apparatus. In a preferred embodiment, the machine tool comprises a spindle in which a measurement probe (a so-called spindle-mounted measurement probe) can be releasably retained.

Advantageously, the machine tool comprises a numerical controller (NC) with a direct SKIP input (also termed a high-speed SKIP) for receiving a trigger signal from the measurement probe. In this manner, a trigger signal issued by the measurement probe (optionally via a probe interface) in the form of an analogue (voltage level) signal is provided to the SKIP input. On receipt of the trigger signal via its SKIP input, the NC captures the current position of the measurement probe within the machine tool (i.e. it "freezes the machine tool scales"). The use of a direct (high speed) SKIP input means the trigger signal is quickly recognised by the numerical controller; i.e. there is minimal controller uncertainty or variations in recognising that a trigger signal has been issued. Advantageously, the numerical controller has a direct SKIP input with a response time of less than 1 millisecond.

Conveniently, the numerical controller has a direct SKIP input with a response time of less than 100 microseconds. Although NCs with direct SKIP inputs are widely used, it should be noted that other techniques exist for communicating a trigger event to a numerical controller and that such techniques could equally be employed in the method of the present invention. For example, our PCT application PCT/GB2018/050130 describes use of a digital data bus for carrying trigger event information.

The method of the present invention may be implemented with any measurement probe that can operate in a touch trigger mode. For example, the output of an analogue probe (also termed a scanning probe) may be compared to a deflection threshold in a controller or interface to generate an appropriate trigger signal. Advantageously, the measurement probe is a tough trigger probe. A touch trigger probe generates a trigger signal on reaching a certain positional relationship with a surface, but it does not output a measure of stylus deflection. A tough trigger measurement probe thus issues a trigger signal after contacting the surface of an object. The measurement probe may be a non-contact (e.g. optical, inductive etc) measurement probe. Preferably, the measurement probe is a contact probe having a stylus for contacting the object that is deflectable relative to a probe housing. The measurement probe may also comprise a tool-setter, such as a contact tool-setter or a non-contact (e.g. laser based) tool-setter.

The present invention also extends to a computer program that, when run on a computer (e.g. a general purpose computer or a numeric controller), implements the method described above. A computer (e.g. a general purpose computer or a numeric controller) programmed to implement the method may also be provided in accordance with the present invention. A computer storage carrier (e.g. a compact disk) for storing such a program may also be provided.

According to a second aspect of the present invention, there is provided a coordinate positioning apparatus comprising a measurement probe and a processor, the processor being configured to generate a measurement cycle for inspecting an object, the measurement cycle including a measurement path along which the measurement probe is moved relative to the object to enable inspection of the object using a series of touch trigger measurements, the processor generating the measurement cycle by defining (e.g. automatically or based on user input) a plurality of touch trigger measurement points on the surface of the object, each of the plurality of touch trigger measurement points having an associated stand-off position from which the measurement probe is accelerated towards the touch trigger measurement point, each of the plurality of touch trigger measurement points being separated from the associated stand-off position by a stand-off distance, characterised in that the processor is configured to define (e.g. automatically or based on user input) different stand-off distances for at least some of the plurality of touch trigger measurement points and to calculate a probing feed-rate to be used when acquiring each touch trigger measurement point based on the stand-off distance associated therewith.

Preferably, the coordinate positioning apparatus comprises a machine tool having an NC with a direct SKIP input. The apparatus may comprise any of the features of the method according to the first aspect of the present invention.

Also described herein is a method (e.g. a computer implemented method) for generating a measurement cycle for inspecting an object using a measurement probe carried by a coordinate positioning apparatus, the measurement cycle including a measurement path along which the measurement probe is moved relative to the object to enable inspection of the object using one or more touch trigger measurements, the method comprising the step of; defining one or more touch trigger measurement points on the surface of the object, each touch trigger measurement point having an associated stand-off position from which the measurement probe is accelerated towards the touch trigger measurement point, each touch trigger measurement point being separated from the associated stand-off position by a stand-off distance, wherein a user defines the stand-off distance for each touch trigger measurement point and a probing feed-rate is calculated for each touch trigger measurement point from the stand-off distance associated therewith.

The invention will now be described, by way of example only, with reference to the accompanying drawings in which.

Figure 1:
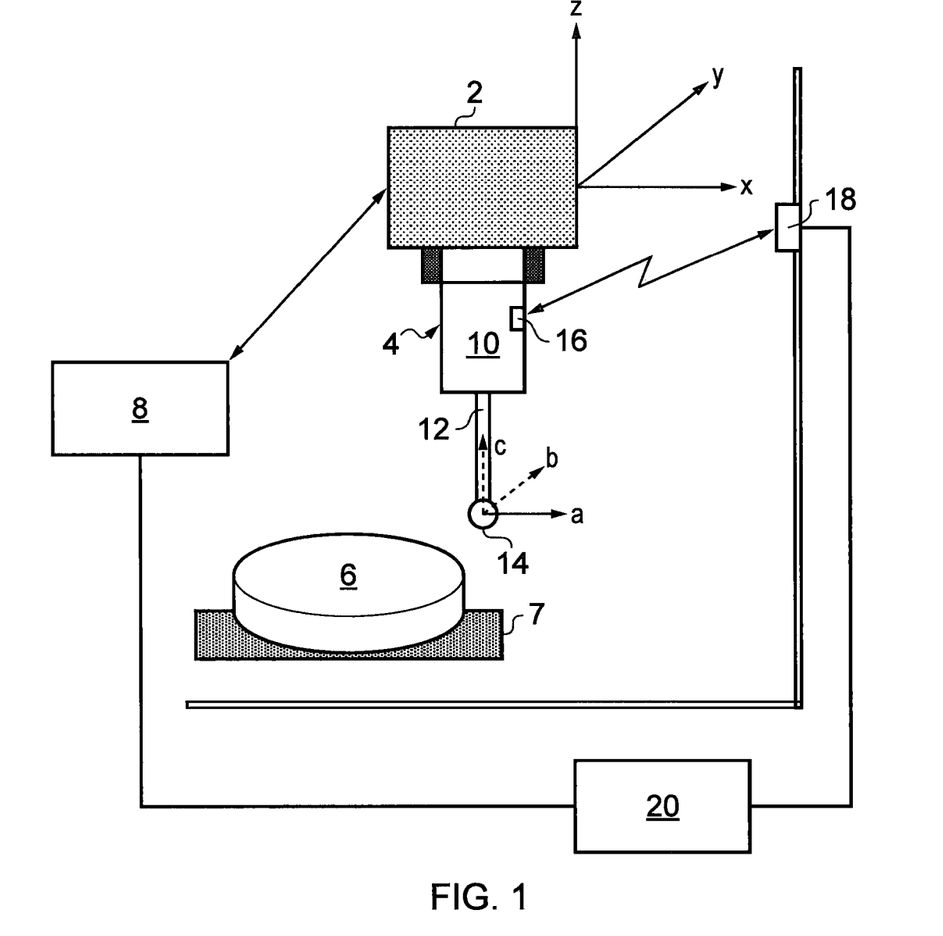
FIG. 1 is an illustration of coordinate positioning apparatus carrying a measurement probe having a deflectable stylus.

Referring to FIG. 1, a machine tool is illustrated having a spindle 2 holding a touch trigger measurement probe 4.

The machine tool comprises known means, such as one or more motors 8, for moving the spindle 2 relative to a workpiece 6 located on a workpiece holder 7 within the work area of the machine tool. The location of the spindle within the work area of the machine is accurately measured in a known manner using encoders or the like; such measurements provide spindle position data defined in the machine coordinate system (x,y,z). A numerical controller (NC) 20 controls (x,y,z) movement of the spindle 2 within the work area of the machine tool and also receives information from the various encoders about spindle position. The NC 20 may comprise a front-end computer or be interfaced to such a computer.

The touch trigger probe 4 comprises a probe body 10 that is attached to the spindle 2 of the machine tool using a standard releasable shank connector. The probe 4 also comprises a workpiece contacting stylus 12 that protrudes from the housing. A stylus ball 14 is provided at the distal end of the stylus 12 for contacting the associated workpiece 6. The touch trigger probe 4 generates a so-called trigger signal when deflection of the stylus exceeds a predetermined threshold. The probe 4 comprises a wireless transmitter/receiver portion 16 for passing the trigger signal to a corresponding wireless receiver/transmitter portion of a remote probe interface 18. The wireless link may be, for example, RF or optical.

The NC 20 receives the spindle position (x,y,z) data and the trigger signal (via the probe interface 18) and records the apparent spindle position data (x,y,z) at the instant the trigger signal is received. After appropriate calibration, this allows the position of points on the surface of objects, such as the workpiece 6, to be measured.

Figure 2:
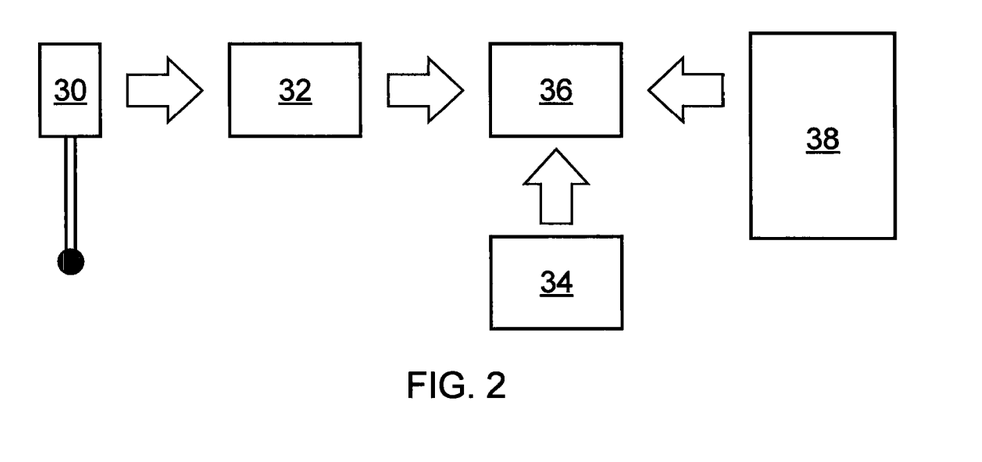
FIG. 2 illustrates the typical architecture of a machine tool probing system.

As schematically illustrated in FIG. 2, a probing system fitted to a machine tool can be considered to comprise five elements. These include the measurement probe assembly 30, the probe interface 32 (which including the probe transmission system and its interface to the CNC system 36), the machine tool 34, the CNC control system 36 and the probe control software 38 that resides on the CNC control system 36. Each of these elements plays a part in the metrology performance of the probing system and the duration of any given measurement or probing cycle.

The key event within any measuring cycle implemented using the above described probing system is the "trigger". Contact of the stylus of the measurement probe 30 with a point on the surface of an object precipitates a change within the probe interface 32 that is passed to the CNC controller 36. This process, which is described in more detail below with reference to FIG. 3, may appear to an operator to happen instantaneously. In reality, however, it involves a series of discrete steps that culminate in a trigger signal being acted upon by the CNC controller 36.

Figure 3:
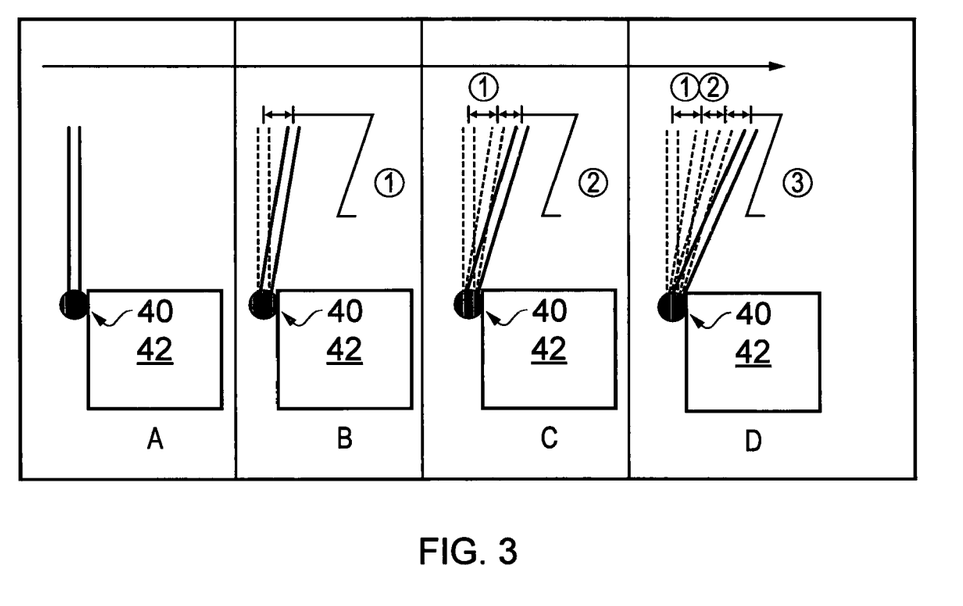
FIG. 3 illustrates the stages of a touch trigger measurement.

Referring to FIG. 3, the various phases of a typical touch trigger probing sequence are illustrated.

During the measurement process, the probe is driven towards the surface of the object 42 to be measured at a certain speed or feed-rate. At a first instant of time A, the stylus tip 40 makes contact with a point on the surface of the object. During this first phase of the measurement process, the probe continues to move towards the object and the stylus is further deflected. At a second instant of time B, the stylus deflection threshold of the measurement probe is exceeded. The distance required to be travelled by the probe between the initial contact with a surface and the probe sensing threshold being reached is called the mechanical pre-travel. In known types of kinematic probe, the mechanical pre-travel is the distance required to bend the stylus sufficiently to store enough strain energy to begin lifting a roller from its seat overcoming the force of the return spring. In a so-called strain gauge probe, the stylus bends until the strain gauge arrangement registers a change in strain that exceeds a preset value. Mechanical pre-travel is probe hardware dependent and does not vary with the speed of probe movement during the measurement cycle. It is thus typically possible to "calibrate out" mechanical pre-travel effects with appropriate calibration and application software.

The second phase of the measurement process, which begins after the mechanical pre-travel or first phase, involves the probe interface recognising that a mechanical trigger event has occurred and issuing a trigger signal to the CNC controller. The delay between the mechanical trigger event and the trigger signal being transmitted to the CNC controller is typically called the interface response time. In other words, the interface issues its trigger signal at the time instant C shown in FIG. 3 at which point the probe has travelled yet further towards the object thereby further deflecting the stylus.

It should be noted that the interface response time typically includes a delay associated with signal filtering. This signal filtering delay arises because a typical probe interface continuously monitors the status of the associated measurement probe and transmits a trigger signal to the CNC system when the measurement probe makes contact with a surface. There are, however, forces acting on the stylus (e.g. inertia) which could be incorrectly interpreted by the interface as a surface contact event. For example, if long styli are used with high probe accelerations it is quite possible to get transient stylus deflections that could lead to so-called "false triggering" (i.e. triggering when the stylus has not actually made contact with a surface). In order to improve the reliability of the trigger signal, probe interfaces are typically arranged to filter out any transient signals and will only transmit a trigger signal to the controller if the deflection threshold signal level is exceeded for a predetermined length of time (e.g. 0.01 secs).There can also be a small delay component of the interface response time associated with transmitting the trigger event from the probe to the interface; for example, 0.002 seconds in the case of a typical optical transmission system or 0.01 seconds in the case of a standard RF communication system. Although the probe interface response time can vary considerably between measurement systems, it is usually constant for a particular set-up and can therefore be calibrated out.

The third phase of a typical probe trigger sequence is the process by which the CNC controller of the machine recognises and acts on a trigger signal received from the probe interface. The CNC controller thus acts on the received trigger signal (e.g. by halting probe movement) at the time instant D shown in FIG. 3, at which point the probe has travelled even further thereby increasing the deflection of the stylus. This time delay introduced by the CNC controller is often called the controller response or scan time.

The CNC controller 36 illustrated in FIG. 2 has a so-called "direct" or "high speed" SKIP interrupt (i.e. input) for receiving the trigger signal from the probe interface 32. In the present example, the probe trigger signal is directly connected to each axis control board and the current axis position can be latched or recorded almost instantaneously upon receipt of the trigger signal. This type of probe signal integration with the axis control boards typically provides a response time or latency in the order of 4 μs, with negligible jitter. It should be noted that various alternative controller architectures are available to implement such a direct SKIP interrupt.

Figure 4:
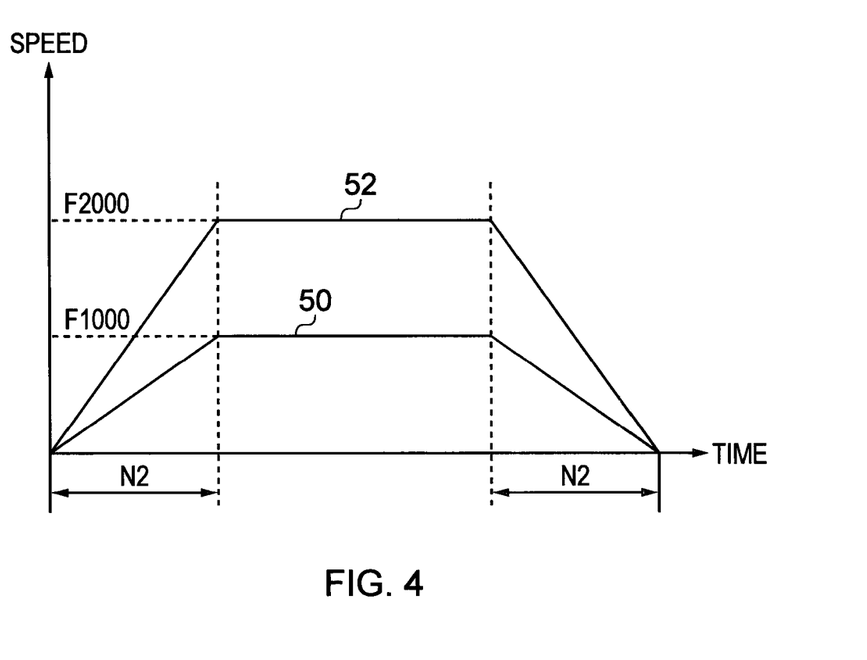
FIG. 4 shows the acceleration zones that exist on one type of machine tool.

Referring to FIG. 4, it is shown how the spindle of a machine tool that carries the measurement probe takes a certain amount of time to accelerate to, or decelerate from, a constant speed or feed-rate. In other words, if a machine tool spindle is commanded by the CNC controller to start moving at a certain feed-rate, it will take a certain amount of time to accelerate to that feed-rate. This region of spindle acceleration and deceleration is often called the "acceleration zone" of the machine.

The control algorithms which determine the way in which a machine tool accelerates and decelerates are set by the manufacturer of the CNC control system. These control algorithms can vary between machine builds and may also be altered when a machine is recalibrated. The main CNC control system manufacturers, Siemens, Fanuc, Heidenhein and Mitsubishi all implement their own particular logic schemes and calculations. However, as a general rule, machine tools do not typically accelerate at constant rates. For Fanuc and Mitsubishi controllers, for example, the rate of acceleration is set so that the programmed feed-rate is reached in a predetermined time (e.g. 0.06 Seconds). Consequently, the distance that is travelled by the machine tool axis to achieve the programmed feed-rate increases linearly with feed-rate. This is shown in FIG. 4 where the speed as a function of time is shown for a commanded move at a first feed-rate of 1000 mm/sec and a second feed-rate of 2000 mm/sec; the speed profiles for the first and second feed-rates being illustrated by lines 50 and 52 respectively.

Figure 5:
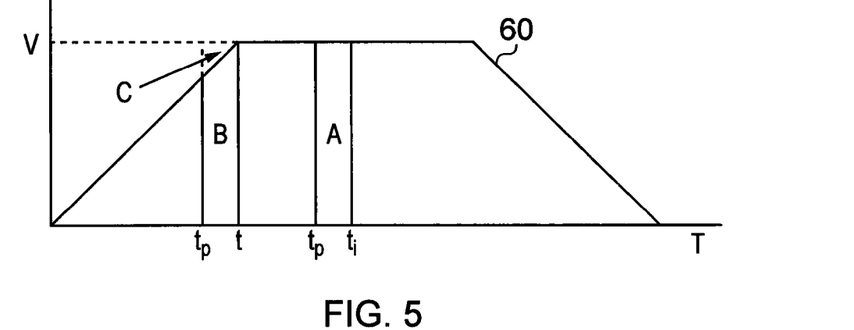
FIG. 5 shows how measurement acquired during periods of machine acceleration produce measurement errors.

Referring to FIG. 5, the detrimental effect of taking measurement in the acceleration 2 5 zone of a machine will be explained. It is generally understood and accepted that all measurement probe systems require calibration after being installed on a machine tool. Typically, this requires the probing of a known surface at the feed-rate that will subsequently be used in measurement cycles. As explained above, there is a difference between the position of a point on the surface of an object that is recorded by the CNC control system and the actual position of that point. This difference arises from the mechanical pre-travel of the measurement probe and the delay due to the probe interface and controller response times. The difference can also be thought of as a time delay between the stylus contacting an object and receipt of a trigger signal by the CNC control system.

FIG. 5 shows a typical velocity versus time plot 60 for a machine tool. As explained above, the time delay due to mechanical pre-travel and the probe interface and controller response times associated with a measurement will be substantially constant for a given installation. To remove the effect of the time delay from measurements acquired with the measurement system, the distance A travelled in the time between the stylus contacting an object at time Tp and the time Ti of issuance of a trigger signal by the probe interface is calculated. This distance A, which is valid for a particular feed-rate, can then be stored and used to correct all future reported positions taken at that feed-rate. Consider now a measurement taken in the acceleration zone of the machine. As the machine is accelerating, the distance B travelled by the measurement probe in the time between the stylus contacting an object at time Tp and the time Ti of issuance of a trigger signal will differ from distance A. In other words, the correction of measured position will be subject to an error C of a magnitude that depends on the portion of the acceleration zone that is used for the measurement.

It can thus be seen that the acquisition of surface measurements whilst a measurement probe is in the acceleration zone should be avoided. In other words, it should be ensured that the measurement probe is moving at a constant velocity (i.e. at the commanded feed-rate) when the stylus makes contact with the surface of an object to ensure accurate metrology. If the measurement cycle is initiated from a stationary start, the measurement probe should therefore be positioned a sufficient distance from the object surface (i.e. at a stand-off position) to allow acceleration of the measurement probe to the required constant speed before any surface measurements are taken; this initial distance or separation between the point to be measured and the measurement probe is termed the stand-off distance. If the stand-off distance is too small, the measurement may be taken whilst the probe is still being accelerated to the required speed by the machine tool thereby reducing the accuracy of the metrology.

Figure 6:
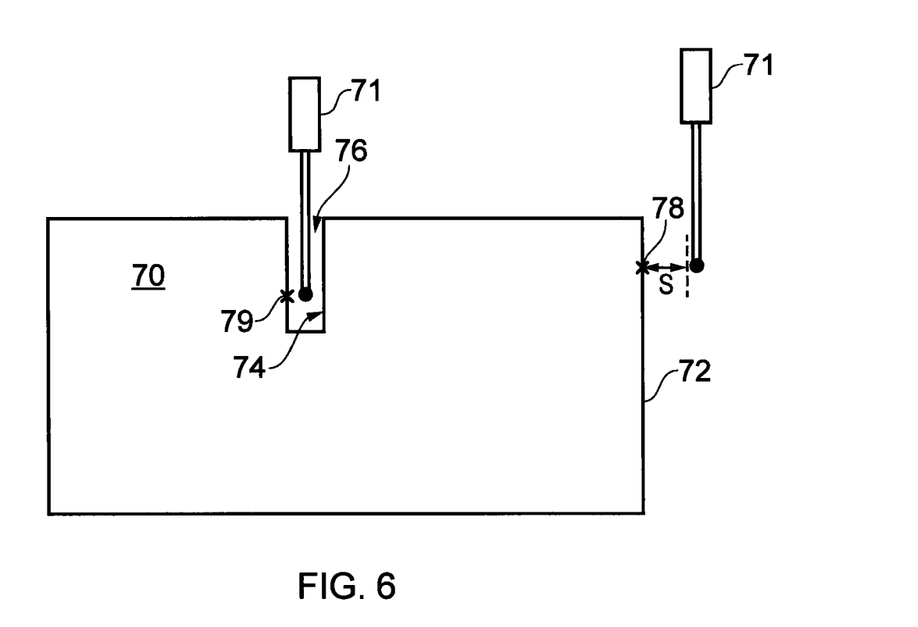
FIG. 6 shows how different stand-off distances may be used for different measurement points.

Conversely, if the stand-off distance is too large, the time taken to drive the probe into contact with the surface of the object at the lower feed-rate can be significant thereby increasing the time required to complete a measurement cycle and reducing overall productivity Referring next to FIG. 6, it will be explained how the prior art process of setting and using a predetermined stand-off distance and probing feed-rate for all measurements taken during a measurement cycle has been found by the present inventors to have several disadvantages. In particular, FIG. 6 shows an object 70 having various surfaces that are to be measured using a measurement probe 71. These surfaces include external surfaces 72 and the internal surface 74 of a small bore 76.

Any measurement points 78 on the external surface 72 can be measured at a relatively high speed (e.g. at a probing feed-rate of F3000 or 3000 mm/minute) but this may require use of a stand-off distance S of at least, say, 2-5 mm (depending on the acceleration characteristics of the machine tool and precision with which the object is mounted within the machine tool). If the radius of the small bore 76 is of a similar magnitude to the 2-5 mm stand-off distance then, taking into account the tolerances on the position of that bore etc, the use of such a feed-rate and stand-off distance may simply not be possible or reliable enough for measuring a point 79 within such bore. Previously, this would have led the machine tool operator to simply reduce the feed-rate (hence decreasing the stand-off distance) so it is suitable for taking all required measurements of the object. The consequence of such a global reduction in feed-rate would be an overall increase in cycle time.

Figure 7:
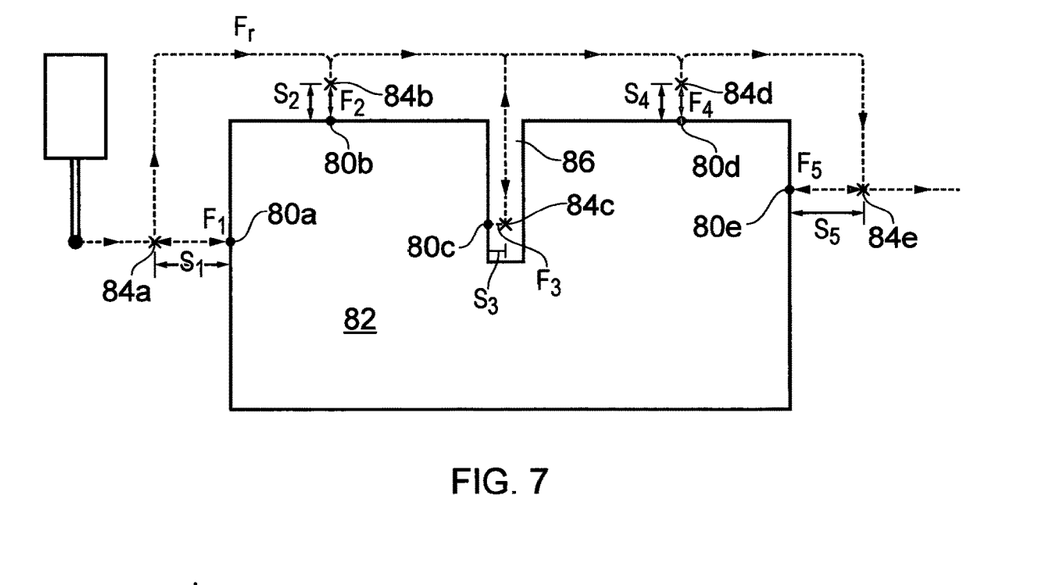
FIG. 7 shows a measurement cycle in which the probe feed-rate is calculated for each measurement point.

Referring next to FIG. 7, it will be illustrated how the present inventors have devised an improved measurement cycle to obviate some of the disadvantages of the prior techniques. As per the prior art methods, the initial stage in generating a measurement cycle is to identify a series of measurement points 80a-80e on the surface of the object 82 that are to be measured. However, a suitable stand-off position 84a-84e is then separately set by the user for each point. The stand-off distances $S_1$-$S_5$ for each of the points 80a-80e can thus all be different from one another, or at least some of them may be different to others, but each stand-off distance is set by the user for measuring the associated measurement point. For example, the stand-off distance $S_3$ used to measure a point 84c within the bore 86 may be significantly less than the stand-off distances $S_1$, $S_2$, $S_4$ and $S_5$ used for measurement points on the exterior surface of the object.

After the user has set the stand-off distances, a probing feed-rate is determined for each measurement point. In particular, a calculation is performed to establish the fastest probing feed-rate that can be used whilst ensuring there is no (or negligible) acceleration at the instant the measurement probe takes a surface position measurement (i.e. so that the commanded probing feed-rate is attained prior to the surface position measurement). In this manner, probing feed-rates $F_1$-$F_5$ are calculated. It should also be noted that the probe may be moved between the measurement positions at a repositioning feed-rate $F_r$. This repositioning feed-rate $F_r$ can be faster than the probing feed-rates and may include regions of acceleration and deceleration because no measurements are taking during the reposition moves. The measurement probe may be brought to a standstill at each stand-off position 84a-84e or it may be moving with a certain velocity when it reaches the stand-off position. The calculation of the fastest probing feed-rates may take into account the velocity or speed of probe motion when it reaches the stand-off position (e.g. a faster probing feed-rate may be possible if the probe is already moving in a direction towards the surface when it reaches its stand-off position). As would be understood by the skilled person, the calculation of the probing feed-rates as described herein may be performed by a computer program running on the CNC control system or on a separate computer.

Figure 8:
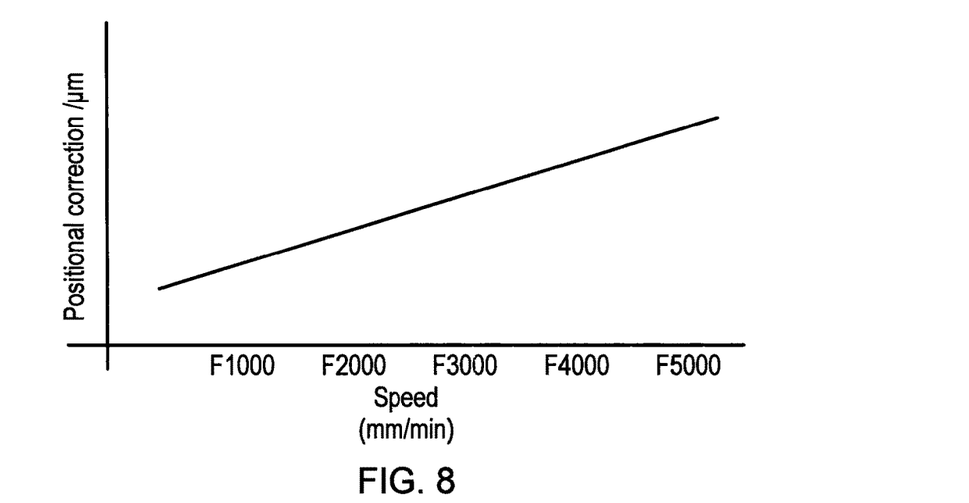
FIG. 8 illustrates the positional variation of measured points that occurs as a function of feed-rate.

Referring to FIG. 8, it will be illustrated how the measurements collected at the different probing feed-rates mentioned above can be converted into accurate surface position measurements. As explained above, there is a substantially constant time delay between the stylus of the probe contacting the surface of the object and the NC freezing the machine tool scales to obtain a measurement of position. This constant delay means that the positional difference between freezing of the scales and the point at which the stylus made contact with the object varies as a function of probing feed-rate. As an example, consider an extremely slow probing feed-rate of, say, F2 (2 mm/minute). The amount of movement of the measurement probe relative to the object between issuance of the trigger signal and the freezing of the scales would be negligible. In contrast, there could be many microns of relative movement if the probing feed-rate was much higher, say F2000 (2000 mm/minute). As explained above, these effects can be removed by appropriate calibration (assuming the velocity is constant when the measurement is taken) but this is typically only performed at the preferred probing feed-rate that will be used for measurement.

To account for the variation in measured position as a function of probing feed-rate, a positional correction is derived when performing a measurement cycle of the type described above with reference to FIG. 7. In particular, a positional correction value is determined as a function of the probing feed-rate. FIG. 8 shows a plot of the positional correction as a function of probing feed-rate. The linear relationship illustrated in FIG. 8 makes it possible to correct (calibrate) touch trigger measurements that are taken at a variety of probing feed-rates; this can be done using a mathematical function or a look-up table. In this manner, speed dependent variations can be removed when taking the multiple measurement points 80a-80e described with reference to FIG. 7 that are collected at different probing feed-rates.

The above examples are described for a touch trigger probing system that comprises a measurement probe having a deflectable stylus implemented on a machine tool. The same principles are, however, applicable to any type of coordinate positioning apparatus and any type of probing system. For example, the techniques could be applied to coordinate measurement machines (CMMs). Similarly, any known type of measurement probe (e.g. contact or non-contact probes) could be carried by the coordinate positioning apparatus.

The invention claimed is:

1. A method for generating a measurement cycle for inspecting an object using a measurement probe carried by a coordinate positioning apparatus, the measurement cycle including a measurement path along which the measurement probe is moved relative to the object to enable inspection of the object using a series of touch trigger measurements, the method comprising the step of:
    defining a plurality of touch trigger measurement points on the surface of the object, each of the plurality of touch trigger measurement points having an associated stand-off position from which the measurement probe is accelerated towards the touch trigger measurement point, each of the plurality of touch trigger measurement points being separated from the associated stand-off position by a stand-off distance,
    wherein the method comprises defining different stand-off distances for at least some of the plurality of touch trigger measurement points and calculating a probing feed-rate to be used when acquiring each touch trigger measurement point based on the stand-off distance associated therewith.

2. The method according to claim 1, wherein the probing feed-rate calculated for each touch trigger measurement point ensures that acceleration to the probing feed-rate has occurred prior to measurement of the touch trigger measurement point.

3. The method according to claim 1, wherein the probing feed-rate calculated for each touch trigger measurement point is the highest feed-rate that ensures acceleration to the probing feed-rate has occurred prior to measurement of the touch trigger measurement point.

4. The method according to claim 1, comprising the step of calculating the probing feed-rate separately for each touch trigger measurement point.

5. The method according to claim 1, wherein the probing feed-rate is calculated using an acceleration characteristic of the machine tool.

6. The method according to claim 1, wherein a compensation is applied to touch trigger measurement points collected at different probing feed-rates, the compensation taking account of the substantially constant time delay between the measurement probe establishing a position sensing relationship with each touch trigger measurement point and the collection of positional information by the coordinate positioning apparatus.

7. The method according to claim 1, wherein the coordinate positioning apparatus comprises machine tool.

8. The method according to claim 7, wherein the machine tool comprises a numerical controller with a direct SKIP input for receiving a trigger signal from the measurement probe.

9. The method according to claim 8, wherein the numerical controller has a direct SKIP input with a response time of less than 1 millisecond.

10. The method according to claim 9, wherein the numerical controller has a direct SKIP input with a response time of less than 100 microseconds.

11. The method according to claim 1, wherein the measurement probe is a contact probe having a deflectable stylus for contacting the object.

12. The method according to claim 1, wherein the measurement probe is a tough trigger probe.

13. A computer program product that, when executed on an appropriate computer, includes instructions that implement the method according to claim 1.

14. A coordinate positioning apparatus comprising a measurement probe and a processor, the processor being configured to generate a measurement cycle for inspecting an object, the measurement cycle including a measurement path along which the measurement probe is moved relative to the object to enable inspection of the object using a series of touch trigger measurements, the processor generating the measurement cycle by defining a plurality of touch trigger measurement points on the surface of the object, each of the plurality of touch trigger measurement points having an associated stand-off position from which the measurement probe is accelerated towards the touch trigger measurement point, each of the plurality of touch trigger measurement points being separated from the associated stand-off position by a stand-off distance, wherein the processor is configured to define different stand-off distances for at least some of the plurality of touch trigger measurement points and to calculate a probing feed-rate to be used when acquiring each touch trigger measurement point based on the stand-off distance associated therewith.

15. The coordinate positioning apparatus according to claim 14 comprising a machine tool having a numerical controller with a direct SKIP input.

* * * * *